Sept. 24, 1929.          B. H. SLOCUM          1,729,460
                        TRIMMER MECHANISM
                        Filed July 17, 1926
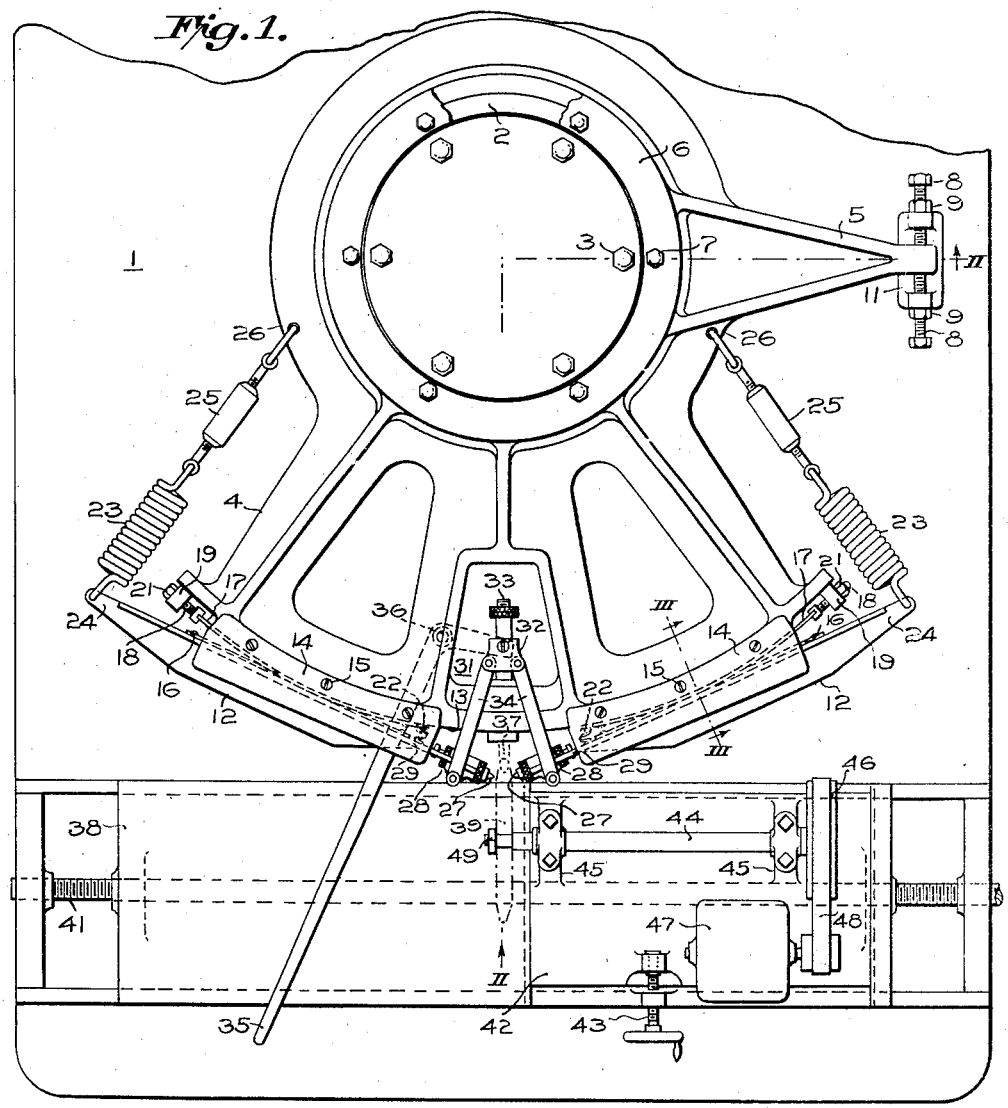
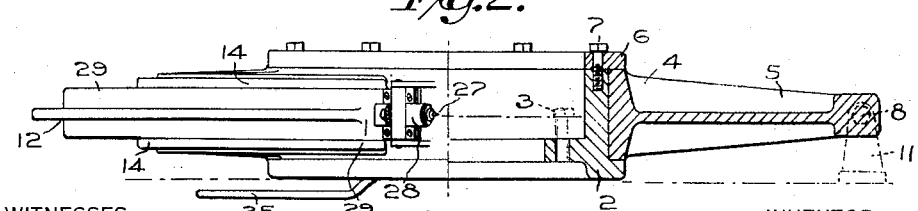
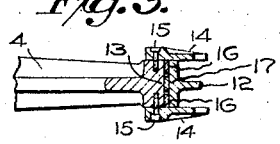
WITNESSES:
R. S. Harrison
W. D. O'Connor
INVENTOR
Burton H. Slocum
BY
Wesley Sloan
ATTORNEY Patented Sept. 24, 1929

1,729,460

UNITED STATES PATENT OFFICE

BURTON H. SLOCUM, OF PITTSBURGH, PENNSYLVANIA, ASSIGNOR, BY MESNE ASSIGNMENTS, TO WESTINGHOUSE ELECTRIC & MANUFACTURING COMPANY, A CORPORATION OF PENNSYLVANIA

TRIMMER MECHANISM

Application filed July 17, 1926. Serial No. 123,202.

My invention relates to trimming mechanisms and, in particular, to mechanisms for trimming grinding wheels to a contour complementary to the tooth space of a gear wheel.

An object of my invention is to provide a trimmer mechanism which shall be of simple, compact and durable mechanical construction and which shall be applicable to trim abrasive wheels for grinding gears of any involute tooth form and for any pitch of gear tooth that it may be desired to grind.

Other objects of my invention are to provide a trimmer mechanism which may be conveniently adjusted to accurately form or trim the abrasive wheel in a simple manner, which shall not require a skilled operator for its manipulation and adjustment and which shall be capable of trimming both faces of the abrasive wheel simultaneously.

Heretofore, trimmer mechanisms that have been used for trimming abrasive wheels employed for grinding gear teeth functioned by means of the engagement of a trimming member with a cam member or templet having an engaging surface of involute shape, either identical with the gear tooth form desired or on a larger scale, the cam member cooperating with the trimming member to act upon the wheel being trimmed either directly or through a reducing mechanism to trim the wheel to the shape of the templet.

Other types of trimmer mechanisms have utilized templet members of shapes differing from that of the contour desired, that acted upon the trimming member to cause it to perform a compound motion and thereby generate the desired curve.

These methods involved an indirect functioning of the mechanism which resulted in inaccuracies, by reason of looseness between the various parts and also deflections of the various connecting links and parts.

My present invention is directed to a device for trimming gear-wheels, which functions on the principle of direct generation of the involute, in accordance with the geometrical definition of the involute of a cylinder of revolution.

I accomplish this direct generation of the involute by causing a trimming member having a plane surface, to roll upon the periphery of a segment of a cylinder. An abrasive point, such as a cutting diamond, is secured to the end of the trimming member and the abrasive wheel is trimmed to the correct form by engaging it, while rotating, with the trimming member, while said member is being rolled on the outer periphery of the cylinder.

The preferred form of my invention embodies two trimming members, for trimming both sides of the abrasive wheel in one operation. Means are provided for adjusting the trimming members to compensate for wear, and other means are provided for alining the wheel to be trimmed with the trimming mechanism and for feeding it into engagement with the trimming members, as successive cuts are taken from the surface.

In the accompanying drawings,

Figure 1 is a plan view of a wheel-trimming mechanism embodying the principles of my invention, Fig. 2 is a view, partially in elevation and partially in section, of the trimming mechanism, the section line being indicated by the line II—II of Fig. 1, and Fig. 3 is a sectional view taken on the line III—III of Fig. 1.

Referring to Fig. 1, the grinding wheel trimmer mechanism comprises a base 1, upon which is mounted a bearing circle 2 that is secured thereto by means of bolts 3. A segmental member 4, having an integral arm 5, is rotatably mounted upon the bearing circle 2 and retained in position by means of a ring 6 that is secured to the bearing circle by cap screws 7. Adjusting screws 8, having lock nuts 9, are mounted in a bracket 11 on the base 1 for engaging the arm 5 of the segmental member 4. Trimmer bars 12 are mounted on the periphery 13 of the segment 4 and retained in position by guide plates 14 that are secured to the segment 4 by screws 15.

Two outer flexible straps 16 and an intermediate strap 17 are interposed between each trimmer bar 12 and the segment 4 and extend longitudinally of said trimmer bars. The straps 16 are attached at one end to the segment 4 and at the other end to the trimmer bar 12. The strap 17 is situated between the straps 16, as shown in Fig. 3, and has one end secured to the trimmer bar 12 at the end opposite to that on which the straps 16 are attached. A tension adjusting screw 18 is secured to the free end of the strap 17 and is retained within a bracket 19 on the segment 4 by means of a nut 21. The function of the straps 16 and 17 is to permit the trimming bar 12 to roll on the surface 13 of the segment 4 and to prevent tangential displacement therebetween. A fabric bellows or shield 22 is provided between the trimmer bar 12 and the segment 4 for protecting the surfaces of the segment and trimmer bar from particles of the grinding wheel that might be accumulated during the trimming operation.

A spring 23 is secured to the end 24 of each trimmer bar 12 and to a turn-buckle 25, which is in turn secured to the segment 4 at a point 26 near its inner circumference. A trimming member 27, such as a cutting diamond, is set in an adjustable holder 28 that is secured to the end 29 of each trimming bar 12.

A mechanism 31 is provided for rolling the trimmer bars 12 upon the segment 4. It comprises a block 32 that is slidably mounted on a guide pin 33. A pair of links 34 are pivoted to the block 32 and to the respective trimmer holders 28. A bell-crank hand lever 35 is pivoted on segment 4 by means of a pin 36, and engages the block 32 to slide it on the guide pin 33 and to impart the proper trimming motion to the trimming members 27 by means of the links 34. A removable gauge pin 37 is provided for setting the trimmer members 27 by bringing them into engagement therewith by means of the adjustable holders 28, as hereinafter more fully described.

A bed member 38 is provided for supporting a wheel 39 to be trimmed and is slidably mounted on the base 1 for laterally adjusting the position of the wheel 39. This adjustment may be accomplished by means of an adjusting screw 41. A slide 42 is slidably mounted on the bed 38 at right-angles to the slidable mounting of the bed member. It is provided with an adjusting screw 43 that serves to feed the wheel being trimmed into engagement with the trimming members 27. The wheel 39 to be trimmed is mounted upon an arbor 44 that is journalled in brackets 45, which are integral with the slide member 42.

A belt pulley 46 is provided on the arbor at the end opposite to that on which the wheel 39 is mounted. A motor 47, also mounted on the slide 42, serves to drive the arbor 44 and the wheel 39 by means of a belt 48 that connects the motor with the belt pulley 46.

The segment 4 and the straps 16 and 17 are so proportioned that the base circle of the tooth form to be generated is described by a radius that is equal to the radius of the segment 4 plus the mean thickness of the straps 16 and 17.

To operate the trimming mechanism, the trimming members 27 are first brought into engagement with the gauge pin 37 by means of the adjustable holders 28. The gauge pin 37 is then removed and the wheel 39 to be trimmed is placed upon the arbor 44 and secured by means of a nut 49.

The segment 4 and the attached trimming apparatus may be adjusted angularly, as desired, by means of the adjusting screws 8 that act upon the arm 5. The wheel 39 is brought into proper lateral relation with the trimming members 27 by moving the bed member 38 by means of the adjusting screw 41. The wheel 39 is then rotated by energizing the motor 47 and brought into light engagement with the trimming members 27 by adjusting the feed screw 43. The trimming members 27 are then actuated by swinging the hand lever 35 through its operating angle. Successive cuts are taken from the wheel 39 by oscillating the trimming members 27 and slowly feeding the wheel 39 into engagement with them, by means of the screw 43, until a true involute curve is formed on each side of the wheel that is exactly complementary to the tooth form desired.

It is evident from the foregoing description of my invention that a trimmer mechanism made in accordance therewith provides a simple and efficient means for accurately trimming and forming involute faces on abrasive wheels for grinding gear teeth. A further advantage is obtained by so constructing the trimmer mechanism that both faces of the grinding wheel may be trimmed in the same operation, thus assuring equal accuracy of form on the two faces and proper spacing of them.

Although I have described a specific embodiment of my invention, it will be obvious to those skilled in the art that various modifications may be made in the details of construction and the design and proportions of the several co-operating parts comprising my trimmer device, without departing from the spirit and scope of my invention as set forth in the appended claims.

I claim as my invention:

1. A trimmer mechanism for abrasive wheels comprising a base member, a cylindrical segment secured thereto, a trimming member adapted to roll on the periphery of said segment, flexible straps interposed between the trimming member and the segment, each strap having one end secured to the segment, one strap having one end secured to one end of the trimming member and the other strap having one end secured to the other end of the trimming member for preventing tangential displacement therebetween, a flexible bellows for excluding foreign matter from beneath the trimming member, a spring for holding the trimming member against the segment, and means for rolling the trimming member upon the segment.

2. A trimmer mechanism for abrasive wheels comprising a base member, a cylindrical segment secured thereto, means mounted on the base for rotatably supporting a wheel to be trimmed, trimmer bars adapted to roll on the periphery of the segment, trimming points mounted on said bars, means for adjusting the tangential position of the trimmer bars, means for adjusting the cylindrical segment angularly, means for feeding the wheel into engagement with the trimmer points, and means for rolling the trimmer on the segment to trim both faces of the abrasive wheel in the form of an involute.

3. A trimmer mechanism for abrasive wheels comprising a base member, a cylindrical segment secured thereto, means mounted on the base for rotatably supporting a wheel to be trimmed, trimmer bars adapted to roll on the periphery of the segment, trimming points mounted on said bars, means for adjusting the tangential position of the trimmer bars, means for adjusting the cylindical segment angularly, means for feeding the wheel into engagement with the trimmer points, and means for rolling the trimmer on the segment to trim both faces of the abrasive wheel in a contour complementary to a tooth space on a gear-wheel.

In testimony whereof, I have hereunto subscribed my name this 30th day of June, 1926.

BURTON H. SLOCUM.